US009708841B1

(12) United States Patent
Kar

(10) Patent No.: US 9,708,841 B1
(45) Date of Patent: Jul. 18, 2017

(54) PROTECTIVE HINGE COVER

(71) Applicant: Gregory Kar, Scottsdale, AZ (US)

(72) Inventor: Gregory Kar, Scottsdale, AZ (US)

( * ) Notice: Subject to any disclaimer, the term of this patent is extended or adjusted under 35 U.S.C. 154(b) by 0 days.

(21) Appl. No.: 14/848,236

(22) Filed: Sep. 8, 2015

Related U.S. Application Data

(60) Provisional application No. 62/047,951, filed on Sep. 9, 2014.

(51) Int. Cl.
*E05D 11/00* (2006.01)
*F16B 2/22* (2006.01)

(52) U.S. Cl.
CPC ............ *E05D 11/0054* (2013.01); *F16B 2/22* (2013.01); *E05D 2011/0063* (2013.01); *E05D 2011/0072* (2013.01); *Y10T 16/5335* (2015.01)

(58) Field of Classification Search
CPC ...... Y10T 16/533; Y10T 16/5335; F16B 2/22; E05D 11/0054; E05D 2011/0063; E05D 2011/0072; E06B 7/367
USPC ..... 16/250, 251; 160/201, 229.1; 248/228.7, 248/230.7, 231.81; 49/398
See application file for complete search history.

(56) References Cited

U.S. PATENT DOCUMENTS 1,268,104 A * 6/1918 Flick et al. ............... E05D 3/12 16/250
2,641,792 A * 6/1953 Peeler ..................... E05C 17/36 16/250
2,772,064 A * 11/1956 Cole .................... B61D 45/001 217/69
3,319,697 A * 5/1967 Krohn ..................... E06B 7/367 16/250
4,344,253 A * 8/1982 Stiles ...................... E06B 7/367 16/250
5,362,131 A 11/1994 Susko
6,527,036 B1 * 3/2003 Welsh ................. E05D 11/0054 16/366
6,698,492 B2 * 3/2004 Lewis, Jr. ............. E05D 15/242 160/201
6,745,435 B2 6/2004 Bowers
6,883,205 B2 4/2005 Martinez-Muñoz
6,935,400 B1 8/2005 Welsh
7,178,197 B2 2/2007 Verheye, Sr.
7,841,573 B1 11/2010 Block (Continued)

OTHER PUBLICATIONS http://www.youtube.com/watch?v=mOiSNqhJcRg.

(Continued)

*Primary Examiner* — William Miller
(74) *Attorney, Agent, or Firm* — Booth Udall Fuller, PLC

(57) ABSTRACT

A hinge cover can be removably attachable to a hinge and include a snap on feature comprising a cylindrically shaped inner surface with a c-shaped cross-section, the c-shaped cross-section comprising an opening and a top portion opposite the opening configured to be releasably coupled to a hinge without adhesive, screws, or nails. The hinge cover can further include a deflecting feature, the deflecting feature further including a width extending in a direction of an axis of the cylindrically shaped inner surface of the snap on feature. The hinge cover can include a first ramp portion sloping away from the top of the snap on feature in a first direction. The hinge cover can include a second ramp portion sloping away from the top of the snap on feature in a second direction opposite the first direction.

12 Claims, 18 Drawing Sheets

(56) References Cited

U.S. PATENT DOCUMENTS

| | | | |
|---|---|---|---|
| 2008/0276421 | A1 | 11/2008 | Vanderpan |
| 2008/0313856 | A1 | 12/2008 | Thompson |

OTHER PUBLICATIONS http://forums.anandtech.com/showthread.php?t=102372.
http://ddmgaragedoors.com/parts/part/HI-CE.html.
http://www.rbadoor.com/finger-protector-for-doors-exterior-pull-side.html?gclid=CP$_{13}$ rkKW7474CFQiUfgodJzcAFQ.
http://hingecovers.com/3-x-4Commercial-Magnetic-Door-HingeCover-5-8radius-corner-10012-1.htm.

* cited by examiner

PROTECTIVE HINGE COVER

RELATED APPLICATIONS

This application claims the benefit of U.S. Provisional Application No. 62/047,951, filed Sep. 9, 2014, the entirety of the disclosure of which is hereby incorporated by this reference.

TECHNICAL FIELD

This disclosure relates to a protective hinge cover and a system configured to reduce damage to objects and persons adjacent moving doors, such as closing vertical roll-up doors including garage doors.

BACKGROUND

Vertical roll-up doors are used in a number of applications for securing or enclosing a space, such as garage doors, moving truck doors, and storefront doors. The vertical roll up doors can include a plurality of segments or panels stacked or aligned one above the other. The plurality of segments or panels can be joined by hinges to allow for rotation or relative movement of the panels with respect to each other as the roll-up doors open up or close off access to the space behind the door as the roll-up door panels move along a track. In instances when objects are adjacent a path of the roll-up door, the object can be struck by, or come in contact with, the roll-up door, resulting in damage to the object, the door, or both.

SUMMARY

A need exists for preventing damage to objects and persons positioned adjacent closing doors. Accordingly, in an aspect, a removably attachable hinge cover can comprise a snap on feature comprising a cylindrically shaped inner surface with a c-shaped cross-section, the c-shaped cross-section comprising an opening and a top portion opposite the opening configured to be releasably coupled to a hinge without adhesive, screws, or nails. The hinge cover can further comprise a deflecting feature, the deflecting feature further comprising a width extending in a direction of an axis of the cylindrically shaped inner surface of the snap on feature. The deflecting feature can further comprise a first ramp portion sloping away from the top of the snap on feature in a first direction. The deflecting feature can further comprise a second ramp portion sloping away from the top of the snap on feature in a second direction opposite the first direction.

The removably attachable hinge cover can further comprise the c-shaped cross-section of the snap on feature comprising a diameter greater than a distance of the opening. The width of the deflecting feature can be less than a width of 5 centimeters and can be configured to be coupled around a hinge fulcrum between tabs of the hinge without extending to the tabs of the hinge. The width of the deflecting feature can comprise a distance greater than 5 centimeters (cm) and can be configured to cover tabs of the hinge to which the hinge cover can be removably attached. The snap on feature and deflecting feature can be integrally formed of a same material. A relative angle between an outer surface of the first ramp portion and the second ramp portion can be in a range of 180-315 degrees. A thickness between the inner surface of the top portion of the snap on feature and an outer surface of the deflecting feature over the top portion can be greater than or equal to 9 millimeters (mm).

In other aspects, a removably attachable hinge cover can comprise a removably attachable hinge cover comprising a snap on feature comprising a c-shaped cross-section with an opening and a top portion opposite the opening configured to be releasably coupled to a hinge without adhesive, screws, or nails. The hinge cover can also comprise a deflecting feature, the deflecting feature further comprising a width extending in a direction of an axis of the cylindrically shaped inner surface of the snap on feature, and a first ramp portion sloping away from the top of the snap on feature in a first direction.

The removably attachable hinge cover can further comprise the snap on feature comprising a cylindrically shaped inner surface with a c-shaped cross-section. The deflecting feature can further comprise a second ramp portion sloping away from the top of the snap on feature in a second direction opposite the first direction. The snap on feature and deflecting feature can be integrally formed of a same material. A relative angle between an outer surface of the first ramp portion and the second ramp portion can be in a range of 180-315 degrees. The c-shaped cross-section of the snap on feature can also comprise a diameter greater than a distance of the opening. A thickness between the top portion of the snap on feature and an outer surface of the deflecting feature over the top portion can be greater than or equal to 9 millimeters.

In yet other aspects, a removably attachable hinge cover can comprise a snap on feature configured to be releasably coupled to a hinge without adhesive, screws, or nails, and a deflecting feature. The deflecting feature can further comprise a width extending in a direction of an axis of the cylindrically shaped inner surface of the snap on feature. The deflecting feature can further comprise a first ramp portion sloping away from the top of the snap on feature in a first direction.

The removably attachable hinge cover can further comprise the snap on feature being configured to couple to tabs at side portions of a hinge without contacting a cylindrically shaped fulcrum portion of the hinge. The deflecting feature can be configured to couple to inner and outer opposing surfaces of a tabs extending from a lower hinge leaf, and is further configured to couple to outer surfaces and not inner surfaces of tabs extending from an upper hinge leaf. The snap on feature can further comprise a c-shaped cross-section with an opening and a top portion opposite the opening configured to be releasably coupled around a fulcrum of a hinge. The deflecting feature can include the first ramp portion without a second ramp portion opposite the first ramp portion. The snap on feature and deflecting feature can be integrally formed of a same material.

Aspects and applications of the disclosure are described below with reference to the DRAWINGS and the DETAILED DESCRIPTION. Unless specifically noted, the words and phrases in the specification and the claims should be given their plain, ordinary, and accustomed meaning to those of ordinary skill in the applicable arts. The inventor is fully aware that he can be his own lexicographer if desired. The inventor expressly elects, as his own lexicographer, to use only the plain and ordinary meaning of terms in the specification and claims unless they clearly state otherwise and then further, expressly set forth the “special” definition of that term and explain how it differs from the plain and ordinary meaning. Absent such clear statements of intent to apply a “special” definition, it is the inventor’s intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly comprise additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

DETAILED DESCRIPTION

Figure 1:
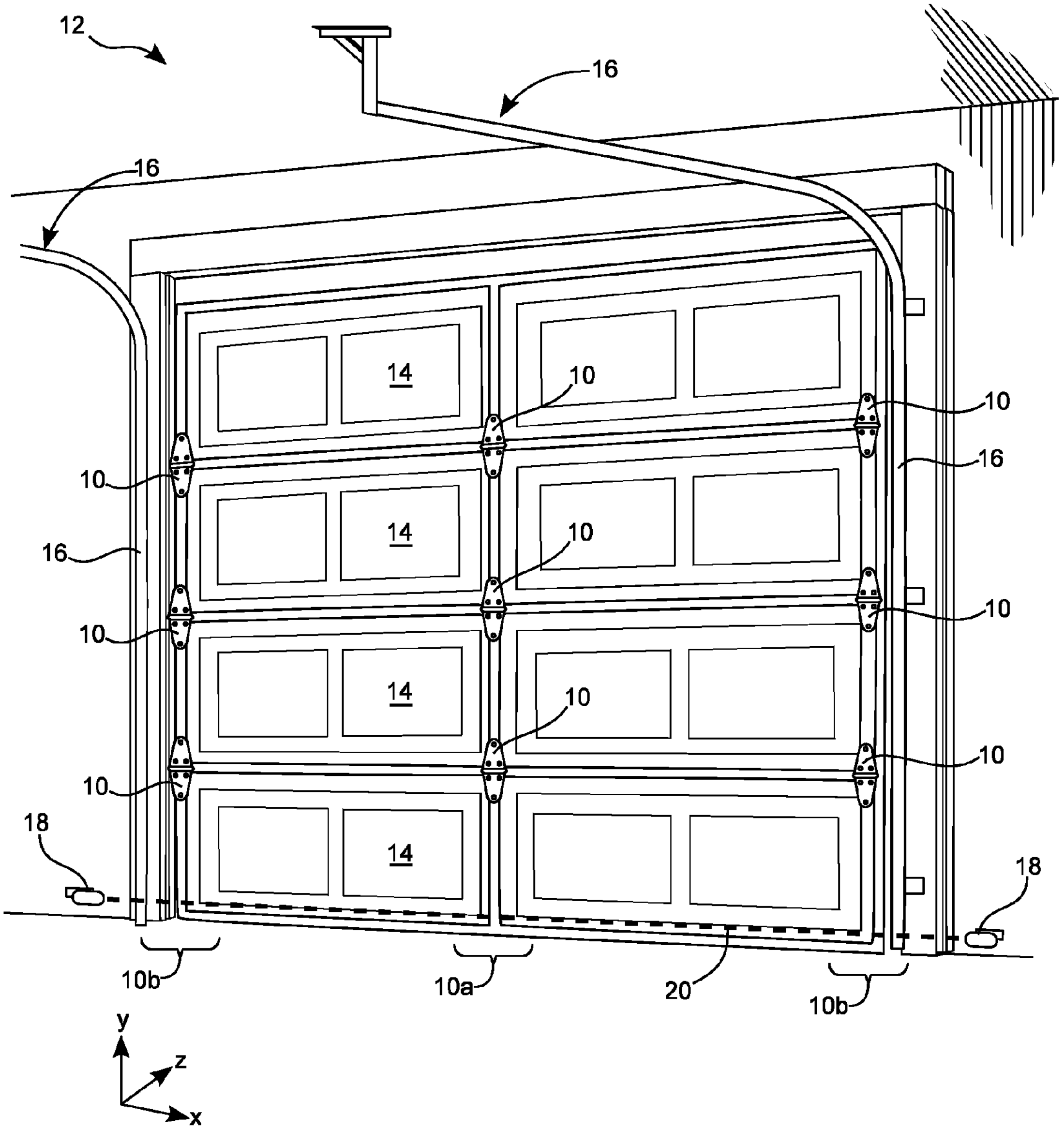
FIG. 1 depicts a vertically opening roll-away door comprising hinged panels.

This disclosure, its aspects and implementations, are not limited to the specific material types, or other system component examples, or methods disclosed herein. Many additional components, manufacturing and assembly procedures known in the art consistent with principles and practices of manufacture are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word “exemplary,” “example,” or various forms thereof are used herein to mean serving as an example, instance, or illustration. Any aspect or design described herein as “exemplary” or as an “example” is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure comprises a number of embodiments in many different forms, there is shown in the drawings and will herein be described in detail, particular embodiments with the understanding that the present disclosure is to be considered as an exemplification of the principles of the disclosed methods and systems, and is not intended to limit the broad aspect of the disclosed concepts to the embodiments illustrated.

This disclosure provides a protective hinge cover and a system configured to reduce damage to objects adjacent moving doors, such as closing vertical roll-up doors including garage doors. As contemplated herein, the hinge guard of the present disclosure can be removably attached to garage door hinges, hinges on doors of moving trucks/vans, or other hinges allowing for upward movement, other translation movement, rotational movement of a door or fixture, or a combination of movements, whether with or without a center pin and knuckles. While the protective hinge cover is applicable to a plurality of different hinges and door types, particular mention is made of hinge covers and garage doors for brevity, clarity, and convenience, and not by way of limitation.

FIG. 1 illustrates a number of exemplary garage door hinges 10 attached to a garage door 12 to rotatably couple together a plurality of panels 14 to form the garage door 12. For convenience, and without limitation, directions and dimensions of the garage door hinges 10, the garage door 12, as well as the removably attachable hinge guards described herein, will be described with respect to orientations and directions shown with respect to the garage door and hinges shown in FIG. 1. Accordingly, a distance or direction along a width of the door extending between the opposing sides or walls of the garage opening will be referred to as a width or x-direction. A distance or direction along a height of the door, or the door opening, between the floor and the ceiling will be referred to as a height or y-direction. Additionally, a distance or direction along a thickness of the door, or the door opening, in a direction perpendicular or orthogonal to the x-direction and y-directions will be referred to as a height a z-direction.

The garage door 12 can be raised, or moved upwards in the y-direction by moving roller hinges or second hinges 10*b* up along track 16 with both the roller hinges 10*b* and the panel hinges 10*a* allowing rotation of the panels 14 to accommodate movement from a vertical section of the track 16 to the horizontal section of the track 16. As shown in FIG. 1, the panel hinges 10*a* can be coupled to adjacent upper and lower garage door panels 14 at a central horizontal portion of the panels between opposing left and right tracks 16, and at upper and lower edges of the panels 14. The roller hinges 10*b* can be coupled to adjacent upper and lower garage door panels 14 at opposing left and right edges of the of the panels 14, as well as being coupled to left and right tracks 16.

Sensors 18 can be placed at a base of the garage door 12 or an opening filled by the garage door 10 to sense if an object occupies a space within the opening to be filled by the garage door 10. The sensors 18 can operate by both emitting and receiving a signal, optical signal, or laser 20 can also interrupt or stop automatic closing of the garage door 12, such as by a motor, when the signal is broken or interfered with, indicating an object that is near, or within, the path of the garage door along the tracks 16. Stopping the descent or close of the garage door 12 when an object is near or within a path of the garage door can prevent contact between the garage door and the object, and resultant damage to both the garage door 12 and the object.

However, in some instances, an object may be outside detection of the sensor, such as when a vehicle is parked within a garage with the vehicle bumper disposed above or away from the sensor, but still within a path of a portion of the garage door 12, such as the garage door hinge 10.

For example, a car bumper (including paint on the car bumper) can be damaged by portions of the garage door 12, such as by a garage door hinge 10 coming in contact with the car or car bumper. Panel hinges 10*a*, being more centrally located on the garage door 12 than roller hinges 10*b*, can more frequently contact or damage car bumpers. As such, bumper damage can result from the garage door 12 being lowered with hinges 10 protruding in a z-direction from a thickness of the garage door 12 so that one or more of the hinges 10 come in contact with the vehicle or bumper as the garage door is being lowered.

In yet other instances, a vertical roll-up door may be without a sensor, such as a door on a moving truck. In the case of a moving truck, the truck may be filled as full as possible, and objects to be transported by the truck may be near the door and its hinges such that the hinges of the door may strike or come in contact with the goods within the truck, causing damage to the goods. Additionally, persons moving in and out of a moving truck with a low ceiling or in other instances in which a person or a person's head will be near the door, door hinges, or both, can also benefit from protection provided by the hinge cover in preventing the person from hitting his head, or otherwise coming into unwanted or unexpected contact with a hinge.

Figure 2A:
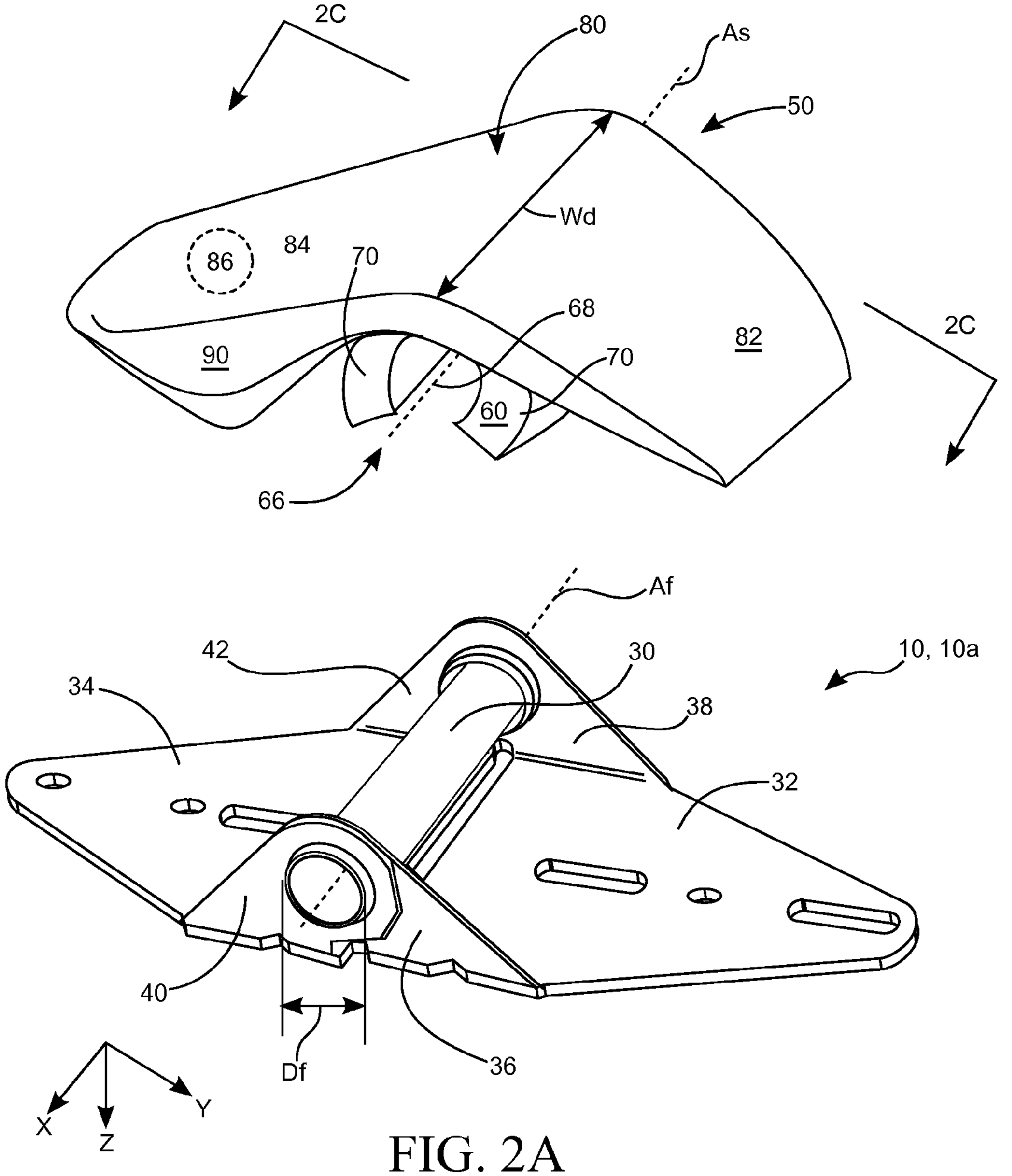
FIGS. 2A-2F depict various views of an embodiment of a hinge cover.

FIG. 2A illustrates a close up of a garage door hinge 10 partially covered by a removably attachable hinge cover 50. The garage door hinge 10*a* comprises a fulcrum, pivot, or axis 30 around which the hinge 10*a* will pivot. When attached to a garage door 12, the panel hinge 10*a* and the fulcrum 30 will be oriented in an x-direction, and be aligned with top and bottom edges of garage door panels 14. The fulcrum 30 can be formed as a cylindrical shaped barrel, bar, or tube that may or may not include a pin disposed within the hollow of the barrel. In embodiments when the fulcrum 30 is defined by a barrel without a pin, the barrel can be hollow or solid. The barrel can have any cross-sectional size or shape including circular. When the barrel is formed as a hollow structure or body configured to hold a pin, the hinge can be segmented and comprise a number of segments or knuckles that allow for the joining of two or more portions or leaves of the hinge to be joined together and rotate around, or with respect to, the fulcrum or pin of the hinge.

The garage door hinge 10*a* can also comprise leaves, such as an upper leaf 32 and a lower leaf 34. Leaves 32 and 34 are referred to, for convenience and not by way of limitation, as upper and lower leaves, but the relative positioning and designation of upper and lower could be reversed. Leaves 32 and 34 can be, or can include, substantially flat or planar portions configured to be attached to adjacent garage door panels 14. The upper leaf 32 and the lower leaf 34 can, without limitation comprise tapered or triangular shapes that narrow as they extend away from the fulcrum of the hinge, only any other shape is also possible.

The upper leaf 32 of the garage door hinge 10*a* can be coupled to the fulcrum 30 through a left tab, flange, bracket, arm, or projection 36 and a right tab, flange, bracket, arm, or projection 38. Tabs 36 and 38 are referred to, for convenience and not by way of limitation, as left and right tabs, but the relative positioning and designation of left and right could be reversed. Similarly, the lower leaf 34 of the garage door hinge 10*a* can be coupled to the fulcrum 30 through a left tab, flange, bracket, arm, or projection 40 and a right tab, flange, bracket, arm, or projection 42. Tabs 40 and 42 are referred to, for convenience and not by way of limitation, as left and right tabs, but the relative positioning and designation of left and right could be reversed.

As shown in FIG. 2A, the tabs 36, 38, 40, and 42 of the upper leaf 32 and the lower leaf 34, respectively, can extend away from the upper and lower leaves 32, 34 in a z-direction. The tabs 36, 38, 40, and 42 can also be coupled to, or disposed around, the fulcrum 30 or left and right ends of the fulcrum 30. The tabs 36 and 38 of the hinge 10*a* can be integrally formed with the leaf 32 such that a single piece is formed, angled, or bent to include each of the features 32, 36, and 38. Similarly, the tabs 40 and 42 of the hinge 10*a* can be integrally formed with the leaf 34 such that a single piece is formed, angled, or bent to include each of the features 34, 40, and 42. Alternatively, the tabs 36, 38, 40, and 42 can be separate pieces from the leaves 32 and 34. The tabs 36, 38, 40, and 42 can also be substantially perpendicular to the leaves 32, 34, and the fulcrum 30.

Roller hinges 10*b* can also include detail similar to the detail included above for panel hinges 10*a*, including fulcrums, upper and lower leaves, and left and right tabs. Roller hinges 10*b* also comprise the additional feature of a shaft, roller, or cylindrical tube 44 parallel to the fulcrum 30 and held by the same or similar left and right tabs for holding a wheel within a track, such as track 16. The garage door hinges 10, including panel hinges 10 and roller hinges 10*b* can be made of metal, such as aluminum, steel, stainless steel, galvanized steel, brass, nickel, copper, bronze, or any other suitable or similar material.

FIG. 2A also shows a hinge guard or removably attachable hinge guard 50 for a garage door hinge 10. The hinge guard 50 can, without limitation, comprise or be formed of one or more durable flexible materials comprising polymers or thermoplastics such as ABS, fluoropolymers, polyacetal, polyamide; polycarbonate, polyethylene, polysulfone, or the like, polycarbonate (PC), polyethylene terephthalate (PET), acrylonitrile butadiene styrene (ABS), polyethylene (PE), polyvinyl chloride (PVC), vinyl nitrile (VN), other plastics, resins, fibers, fiberglass, carbon fiber, or other similar or suitable material. The hinge guard 50 can be stamped, in-molded, injection molded, vacuum formed, or formed by another suitable process. The hinge guard can comprise a single material integrally formed. Alternatively, the hinge guard can comprise additional layers that can also be formed with, or added to, the hinge guard. Any and all of the materials used can comprise suitable stiffness, rigidity, and flexibility to allow enough flex for the hinge guard to be releasably and mechanically coupled to a hinge without glue or other adhesives while being firmly attached to the hinge during operation.

The hinge guard 50 can comprise a snap on feature or connecting portion 60 and a deflecting feature or protective portion 80. The snap on feature 60 can comprise a cylindrically shaped inner surface 62 with a c-shaped cross-section 64, the c-shaped cross-section 64 comprising an opening 66 and a top portion 68 opposite the opening 66 configured or designed to be mateably and releasably coupled with the fulcrum 30 of the hinge 10 without a use of adhesive, screws, or nails. The snap on feature 60 can comprise a width Ws, measured in an x-direction, that can be the same as, less than, or greater than, a width Wd of the deflecting feature 80.

Figure 2B:
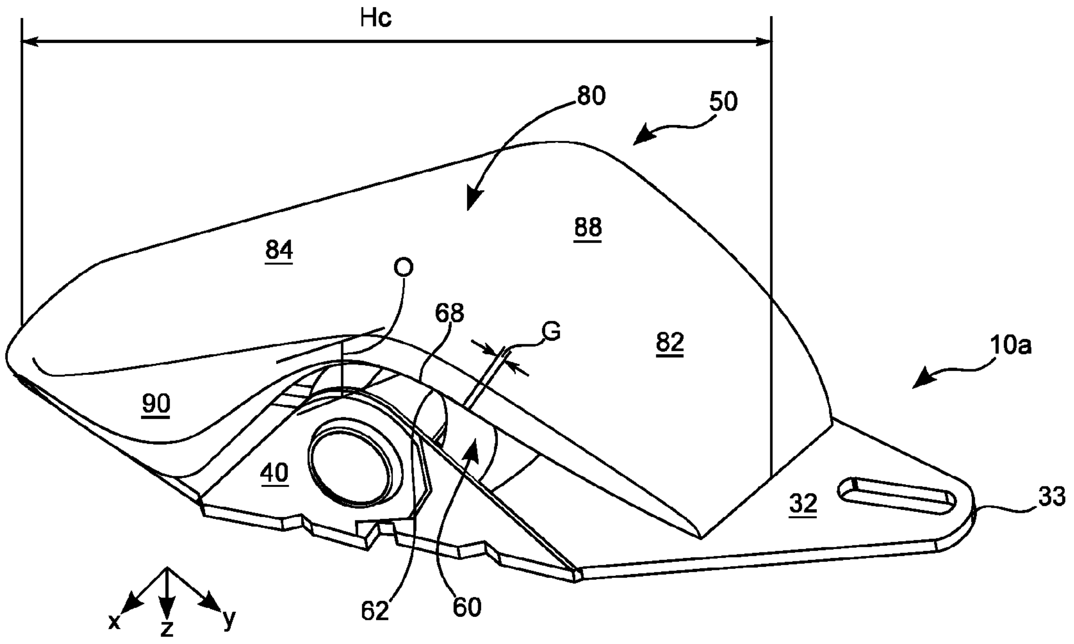

As such, the hinge guard 50 can be releasably coupled or snapped into place around the fulcrum 30 of the hinge 10 by lowering or snapping the hinge guard 50 onto the hinge 10 as shown in FIG. 2A so that the inner surface 62 of the snap on feature 60 is mateably coupled with, or at least partially, or completely, in contact with the surface of the fulcrum 30. Thus, the hinge guard 50 can be snapped onto the hinge 10, as shown in FIG. 2B, by expanding sidewalls or a deformable portion 70 of the snap on feature 60 so that a size of the opening 66 is expanded to a size or distance that that is at least equal to, or larger than, a diameter of the fulcrum Df. Accordingly, the snap on feature 60 can be disposed over the fulcrum 30 and the sidewalls 70 can subsequently contract, shrink, or return to a relaxed state in which the opening 66 comprises a distance less than the fulcrum diameter Df. In its relaxed state, the diameter of the inner surface 62 Ds can be equal to or larger than a diameter of the fulcrum 30. When the diameter Ds is greater than the diameter Df, a resulting gap or offset G is formed between the fulcrum 30 and the inner surface 62 which can allow for the hinge guard 50 to rotate around the fulcrum 30. The hinge guard 50 can rotate around the fulcrum 30 in a direction radially perpendicular to an axis Af of the fulcrum 30, wherein the axis Af is defined by a line formed by the centers of the two bases or ends of the fulcrum 30. Similarly, the hinge guard 50 can rotate around the fulcrum 30 in a direction radially perpendicular to an axis As of the inner surface 62 of the snap on feature 60, wherein the axis As is defined by a line formed by the centers of the two bases or ends of the cylindrically shaped inner surface 62. Additionally, the hinge guard 50 can rotate around the fulcrum 30 within the y-z plane.

In some instances, the gap G, an amount of deformation of the sidewalls 70, or both, can be in a range of 0.2-10 mm, or 0.5-5 mm, or about 1-3 mm, so that the hinge guard is coupled to the hinge, such as by friction, and will not be accidently or inadvertently removed during normal operation of the garage door or with incidental or minimal contact between the hinge cover 50 and an object in a path of the closing garage door 12, such as a car bumper. In some instances, an amount of force required to remove the hinge guard 50 from the hinge 10 will be less than is required to prevent the garage door 12 to continue closing, such as by activation of a safety feature of the garage door.

The hinge guard 50 can also comprise a deflecting feature or protective portion 80. The deflecting feature 80 can further comprise a width W extending in a direction of the axis As of the cylindrically shaped inner surface 62 of the snap on feature 60, or in the x-direction. The deflecting feature 80 can further comprise an upper or first ramp portion 82 that slopes, extends, or tapers away from the top portion 68 of the snap feature 60 in a first direction above the snap on feature 60 in the y-direction perpendicular to the axis As of the snap on feature 60, or in a y-direction. The deflecting feature 80 can further comprise a second ramp portion 84 that slopes, extends, or tapers away from the top portion 68 of the snap feature 60 in a second direction opposite the first direction below the snap on feature 60 in the y-direction or perpendicular to the axis As of the snap on feature 60.

In some embodiments, the lower ramp portion 84 can be larger than a size of the upper ramp portion 82. Stated another way, the lower ramp portion 84 can comprise a mass or weight that is greater than the mass or weight of the upper ramp portion 82 such that a force of gravity acting on the hinge guard 50 will cause the hinge guard 50 to rotate around the fulcrum 30 and be oriented with the lower ramp portion 84 aligned or oriented in downwards direction to prevent objects near the garage door 12 to strike, come in contact with, or be damaged by the hinge 10. In some instances, a weight or counterbalance 86 can be embedded or disposed within the lower ramp portion 84 to make the lower ramp portion significantly heavier than the upper ramp portion, such as greater than 20% heavier, 60% heavier, or 100% heavier. The weight or counterbalance can be formed of one or more portions and be disposed at one or more locations on or within the lower ramp portion 84. The weight 86 can be disposed or embedded within a portion of the deflecting feature 80 that is opposite, off-set, or away from the snap on feature 60, so as to more readily induce pivoting of the hinge guard 50 around the hinge 10 and the fulcrum 30.

The deflecting feature 80 can comprise, or be formed with, an outer or upper surface 88 that is opposite the inner surface 62 or opposite the top portion 68 of the inner surface 62. The outer surface 88 can include an offset O, shown for example in FIG. 2B, that extends between the outer surface 88 of the deflecting feature 80 and the tops of tabs 36, 38, 40, and 42. The offset O can comprise a distance greater than or equal to 2 mm, 4 mm, 6 mm, or other suitable distance. The hinge guard 50 can comprise a thickness T, shown for example in FIG. 2C, that extends between the inner surface 62 or the top portion 68 of the inner surface 62 and the outer surface 88 of the deflecting feature 80. The thickness T can comprise a distance greater than or equal to 8 mm, 10 mm, 13 mm, or any suitable distance that provides for a suitable offset O. As such, the offset O provided by the hinge guard 50 blocks the hinge 10 and the tops of tabs 36, 38, 40, and 42 from contacting or damaging objects such as car bumpers, and allows the softer, more deformable, and protective material of the hinge guard 50 to contact the objects to prevent damaging the object.

As a removable hinge guard, the hinge guard 50 can be applied to the garage door hinge 10 without an adhesive or permanent adhesive so that the hinge guard 50 can be applied, or snapped on, to cover the hinge 10 and then be subsequently removed without damaging the hinge guard 50, and without preventing the hinge guard 50 from being subsequently reattached to a same of different hinge 50, without leaving any sticky residue or adhesive on the hinge 10. By being removable, the hinge guard 50 can also be releasably coupled to a the hinge 10 without screws, nails, or other similar mechanical fasteners, by forming the hinge guard 50 of a deformable material that is substantially identical in size and shape to at least a portion of the hinge 10 that will be covered. The deformable hinge guard 50 can then be disposed over and friction fit to at least a portion of the hinge 10, such as the fulcrum 3, without tools and without additional mechanical fasteners such as screws, nails, clips, latches, rivets, or other device.

A height Hc of the hinge cover 50, as measured in the y-direction, can be less than, equal to, or greater than a height Hh of the hinge 10, as measured in the y-direction. In various instances, the deflecting feature can 80 can cover an entire height Hh, or less than entire height Hh, of the hinge 10. In some instances, none, one, or both of the upper ramp portion 82 and the lower ramp portion 84 can comprise the same or different heights. As a non-limiting example, FIG. 2B shows an embodiment in which the lower ramp portion 84 includes a height greater than the lower leaf 34 of the hinge 10 so that a distal end of the lower leaf is covered by the lower ramp portion 84. Conversely, FIG. 2B shows an embodiment in which the upper ramp portion 82 includes a height less than a height of the upper leaf 32 of the hinge 10 so that a distal end 33 of the upper leaf 32 is exposed by the upper ramp portion 82. An amount or a height of the upper leaf 32 and lower leaf 34 covered by the upper ramp portion 82 and the lower ramp portion 84, respectively, can vary based on particular applications, and can include amounts of a half, two-thirds, three-fourths, or other desirable amount of coverage of the hinge 10.

An relative angle θ between the outer surface 88 of the upper ramp portion 82 and the lower ramp portion 84 can change based on the height and slope of the ramp portions. However, in some instances the angle θ can be in a range of 180-315 degrees, or 220-300 degrees.

Figure 2C:
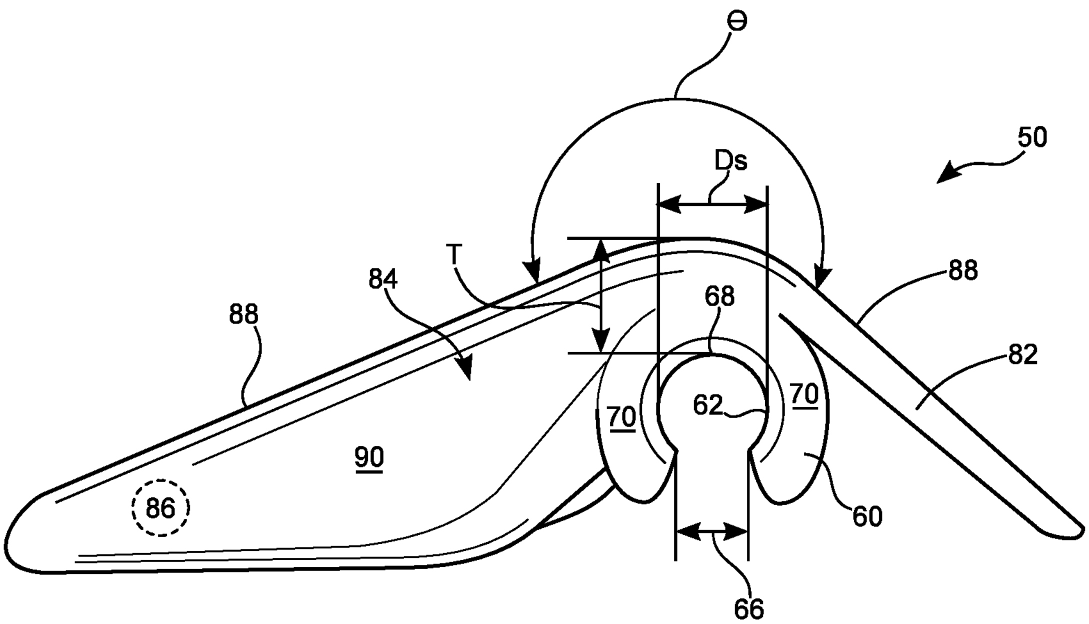

FIG. 2C shows a cross-sectional profile view taken along the cross-sectional line 2C-2C shown in FIG. 2A. FIG. 2C also provides additional detail of the c-shaped cross-section 64 of the snap on feature 64, which comprises a diameter Ds that can be equal or substantially equal to the diameter Df of the fulcrum 30. As used herein, substantially equal can include distances that are equal or distances that differ by 0-20% or 0-10%. The opening 60 can comprise a distance that is less than the distance of the diameter Ds when the sidewalls 70 are in a relaxed or at rest state. When at rest, the opening 66 can comprise a distance that is 50-90%, 60-80%, or about 70% of a distance of the diameter Ds.

FIG. 2C also shows that the lower ramp portion 84 can comprise a greater size or volume than the upper ramp portion 82. The greater volume or robustness of the lower ramp portion 84 can comprise a sidewall or thickened sidewall 90 that extends in a z-direction away from the outer surface 88. The increased or greater volume of the lower ramp portion 84 with respect to the lesser volume of the upper ramp portion 82 can help facilitate the hanging or positioning of the lower ramp portion 84 in a position that is down and away from the fulcrum 30. The increased or greater volume of the lower ramp portion 84 with respect to the lesser volume of the upper ramp portion 82 also makes the hinge guard 50 more robust for impacts that occur between an object and the lower ramp portion 84 when the hinge guard 50 is being lowered with a closing door.

Figure 2D:
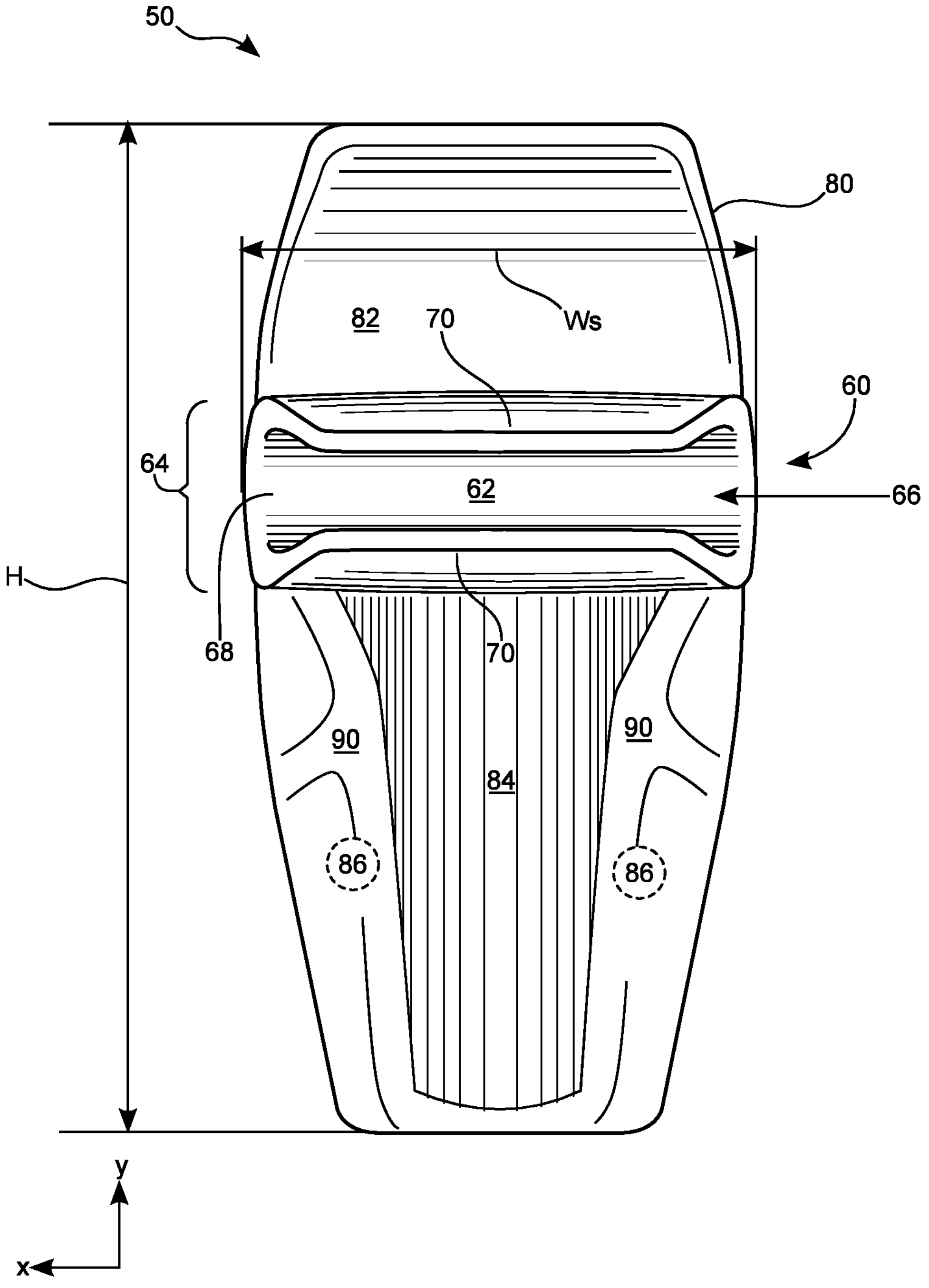
Figure 2E:
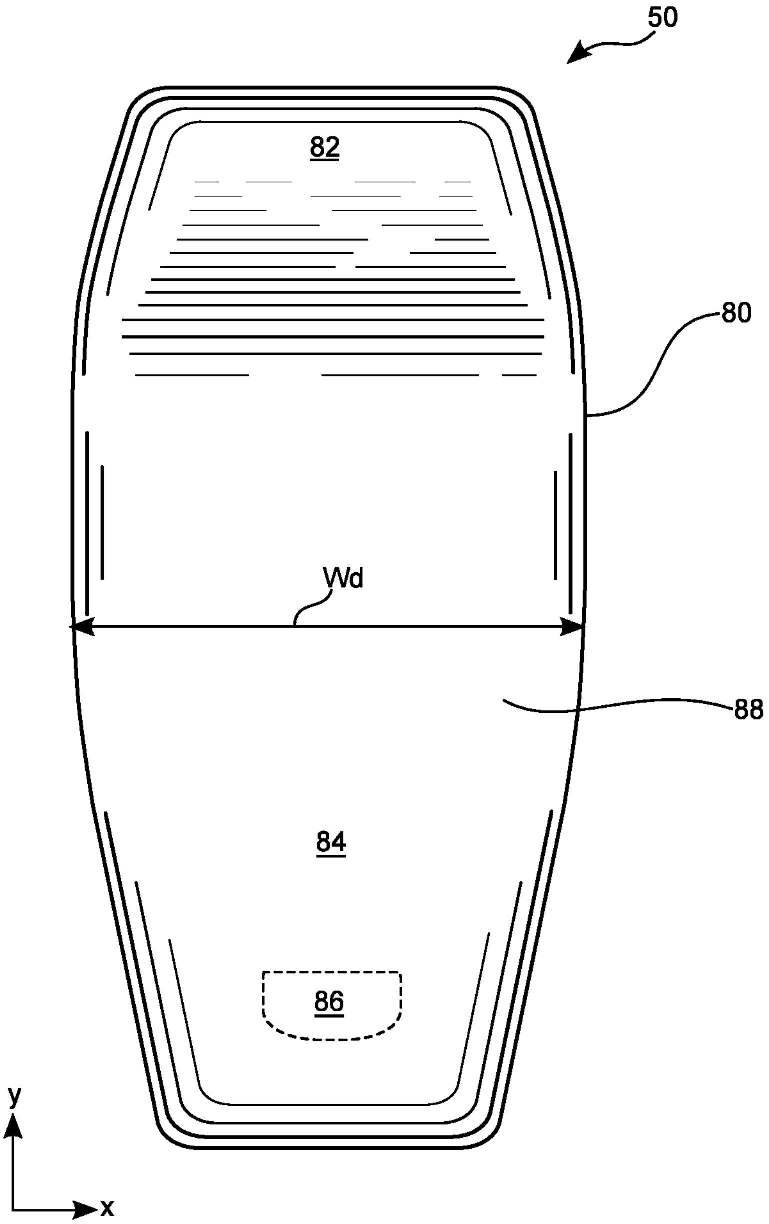
Figure 2F:
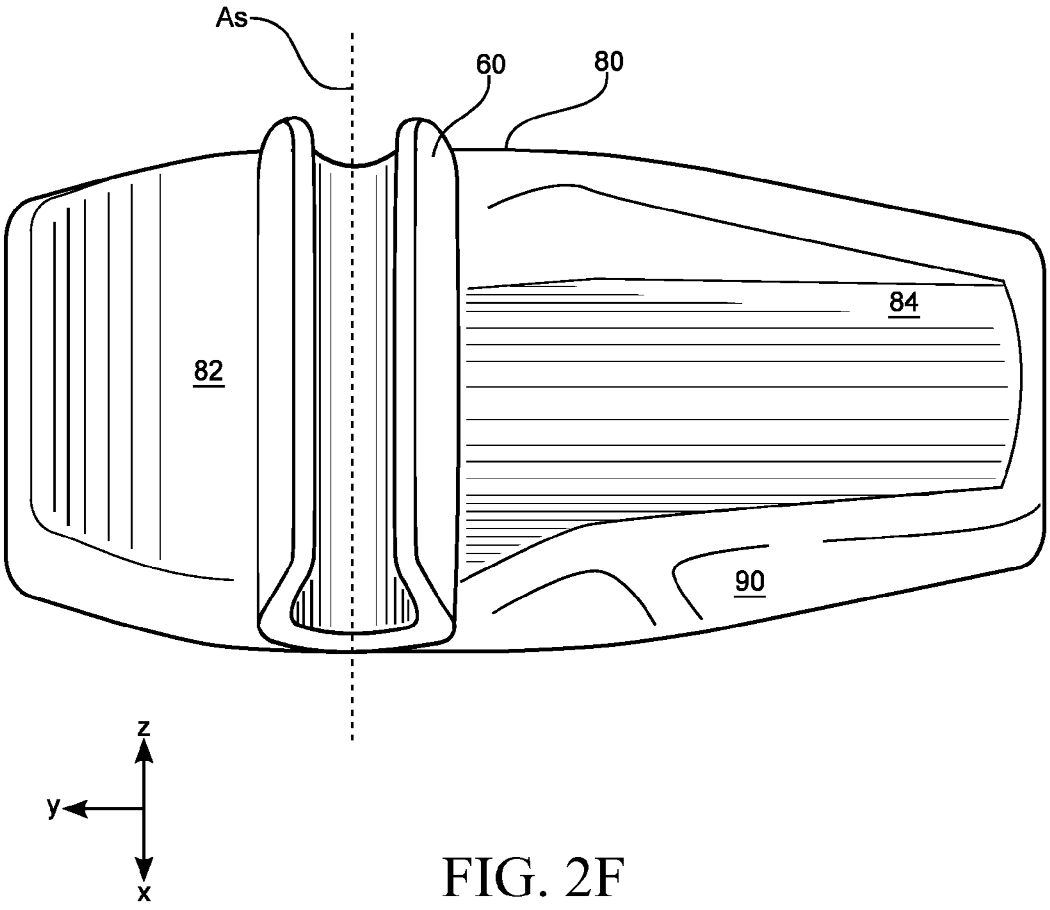

FIG. 2D shows an underside of the hinge guard 50 in the x-y plane. While the lower ramp portion 84 is shown with thickened sidewall 90 and the upper ramp portion 82 is shown without sidewalls, other embodiments of the hinge guard 50 can comprise the upper ramp portion 82 also including sidewalls. Similarly, FIG. 2E shows a topside of the hinge guard 50 in the x-y plane, opposite the view of the underside of the hinge guard 50 shown in FIG. 2D, in which the outer surface 88 of the upper ramp portion 82 and the lower ramp portion 84 are visible. FIG. 2F shows a perspective view of the underside of the hinge guard 50, similar to the view shown in FIG. 2D.

Figure 3A:
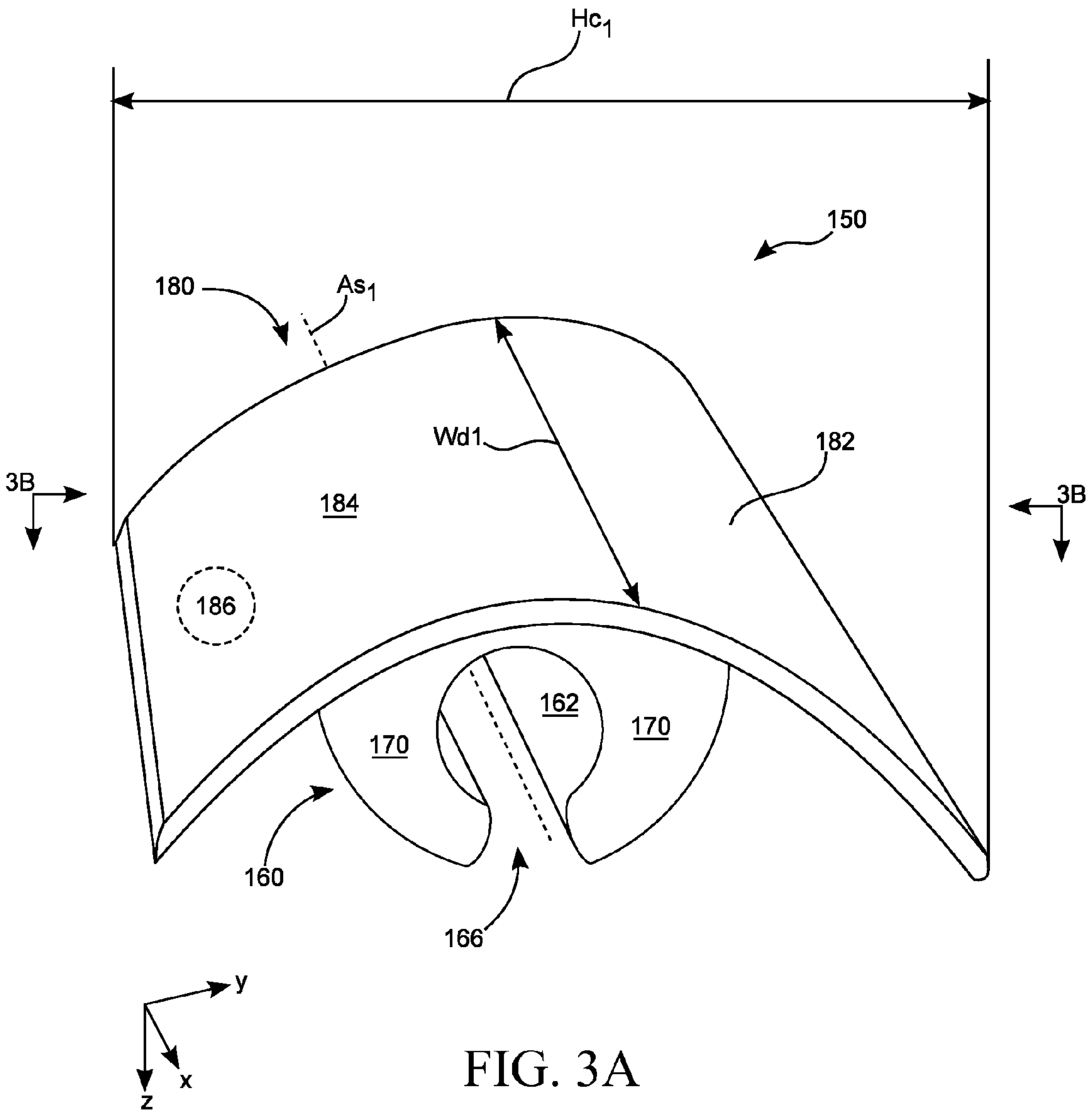
FIGS. 3A-3C depict various views of another embodiment of a hinge cover.
Figure 3B:
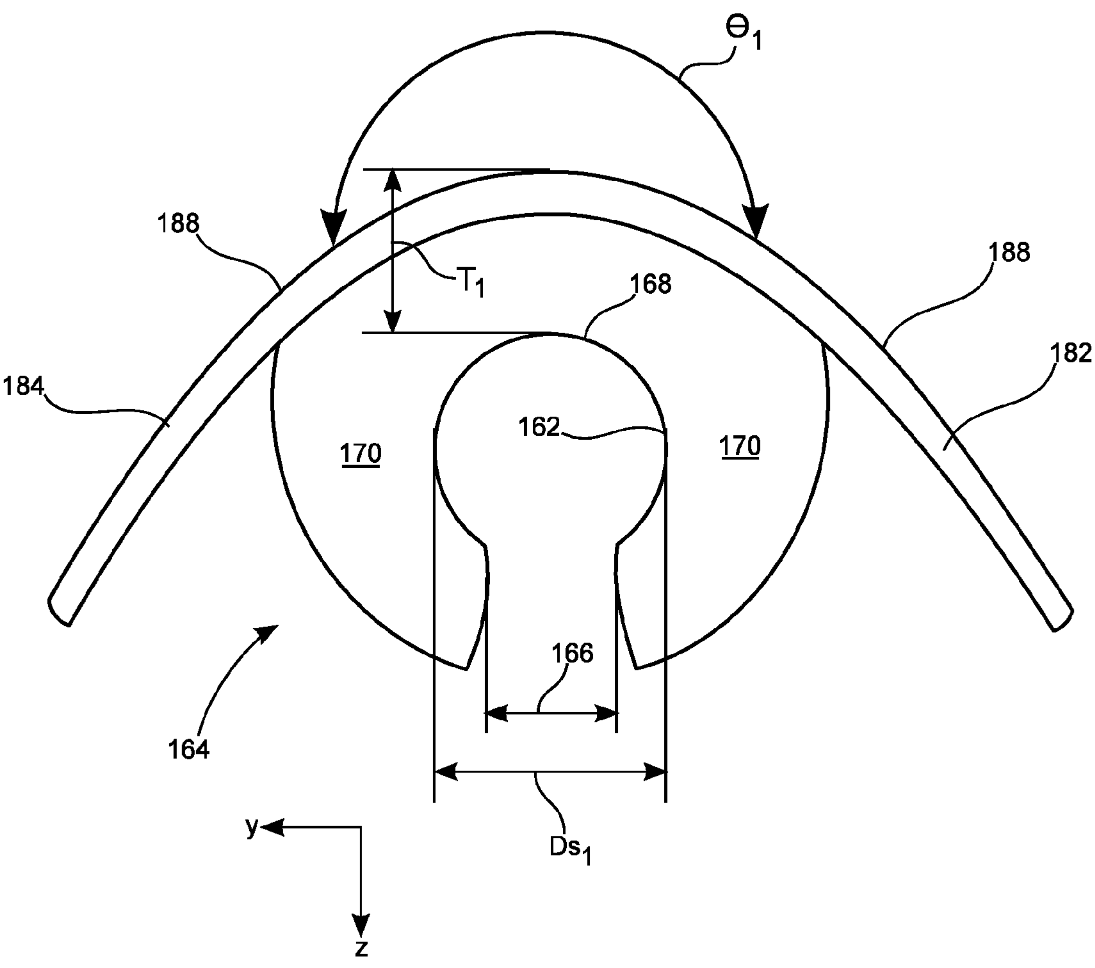
Figure 3C:
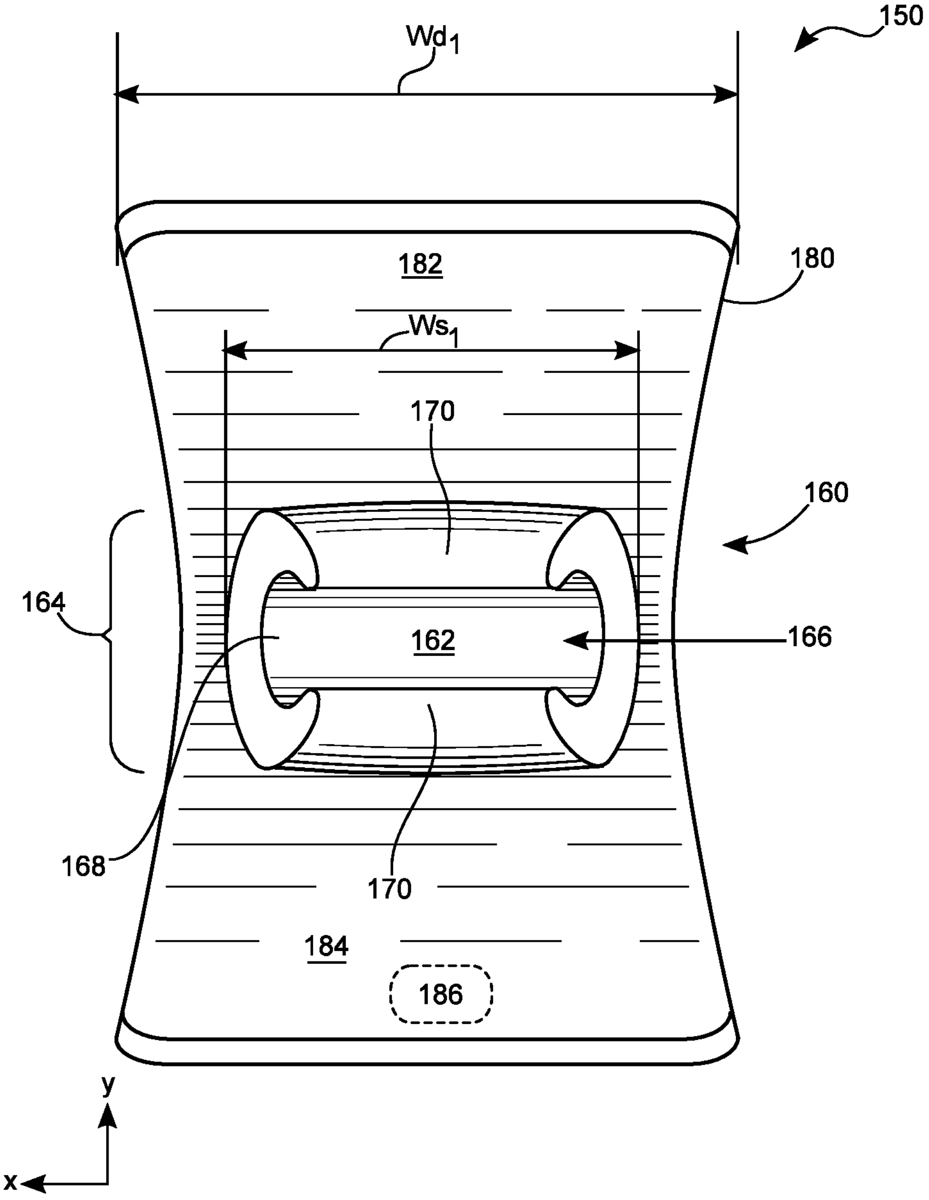

FIGS. 3A-3C show hinge guard or removably attachable hinge cover 150 similar to the hinge guard 50 shown in FIGS. 2A-2E, where similar features are indicated by similar reference number (plus 100). The hinge guard 150 can differ from the hinge guard 50 in a number of respects, which may be the same or different to the features shown embodied in the hinge cover 50, and are provided by way of illustration and not by way of limitation. Various differences are shown with respect to the perspective view of FIG. 3A, the cross-sectional view of FIG. 3B in the y-z plane, taken along the section line 3B-3B shown in FIG. 3A, and in the bottom view in the x-y plane shown in FIG. 3C.

As such, FIGS. 3A-3C show a hinge guard or removably attachable hinge cover 150, a snap on feature or connecting feature 160, an inner surface or cylindrically shaped inner surface 162, a width Ws1 of snap on feature 160, a thickness T1 that extends between the inner surface 162 or the top portion 168 of the inner surface 162 and the outer surface 188 of the deflecting feature 180, a diameter Ds1 of the inner surface 162, an axis As1 of the snap on feature 160, a c-shaped cross-section 164, an opening 166, a top portion 168, sidewalls or a deformable portion 170 of snap on feature 160, a deflecting feature or protective portion 180, a width Wd1 of deflecting feature 180, an upper or first ramp portion 182, a lower or second ramp portion 184, a weight or counterbalance 186, an outer or upper surface 188, an offset between top of tabs 36, 38, 40, 42 and the outer surface 188, a height Hc1 of the hinge cover 150 in y-direction, and a relative angle θ1 between the outer surface 188 of upper ramp portion 182 and lower ramp portion 184.

Differences between the hinge guard 50 and the hinge guard 150 can include, for example, the snap on feature 160 of hinge guard 150 comprising a width Ws1 that is less than a width Wd1 of the deflecting feature 180. Additionally, a thickness of T1 that extends between the inner surface 162 or the top portion 168 of the inner surface 162 and the outer surface 188 of the deflecting feature 180 can be greater than the thickness T of the hinge guard 50.

The hinge guard 150 can also differ from the hinge guard 50 by forming the deflecting feature 180, both the upper or first ramp portion 182 and the lower or second ramp portion 184, being formed without a thickened sidewall, such as the thickened sidewalls 90 of hinge guard 50.

Figure 4A:
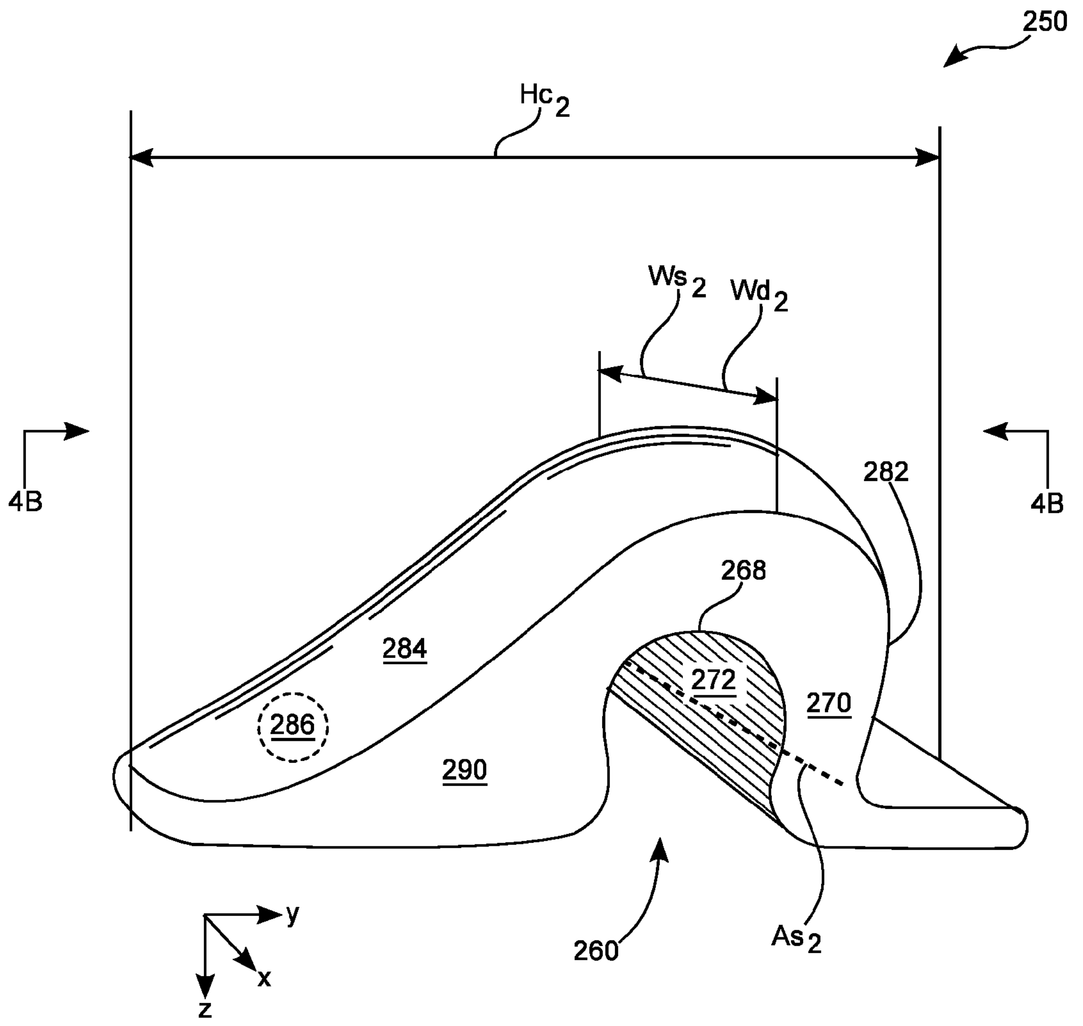
FIGS. 4A-4C depict various views of another embodiment of a hinge cover.
Figure 4B:
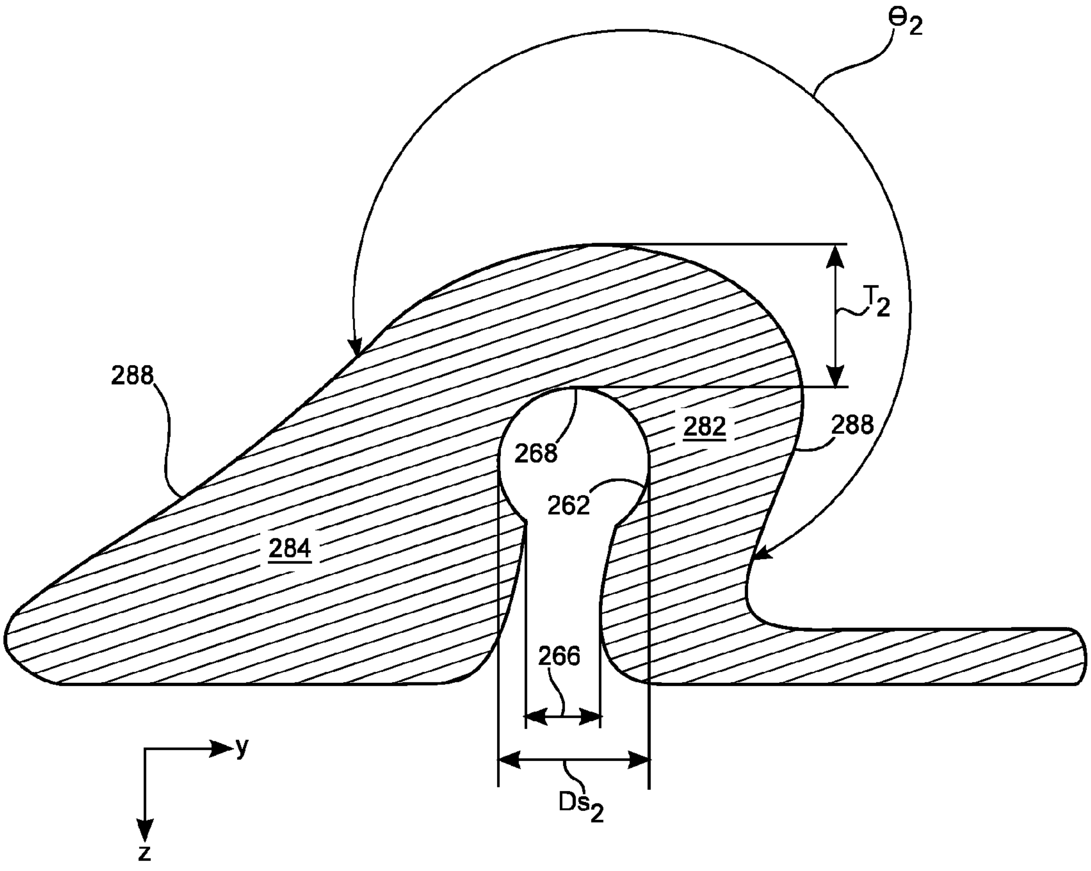
Figure 4C:
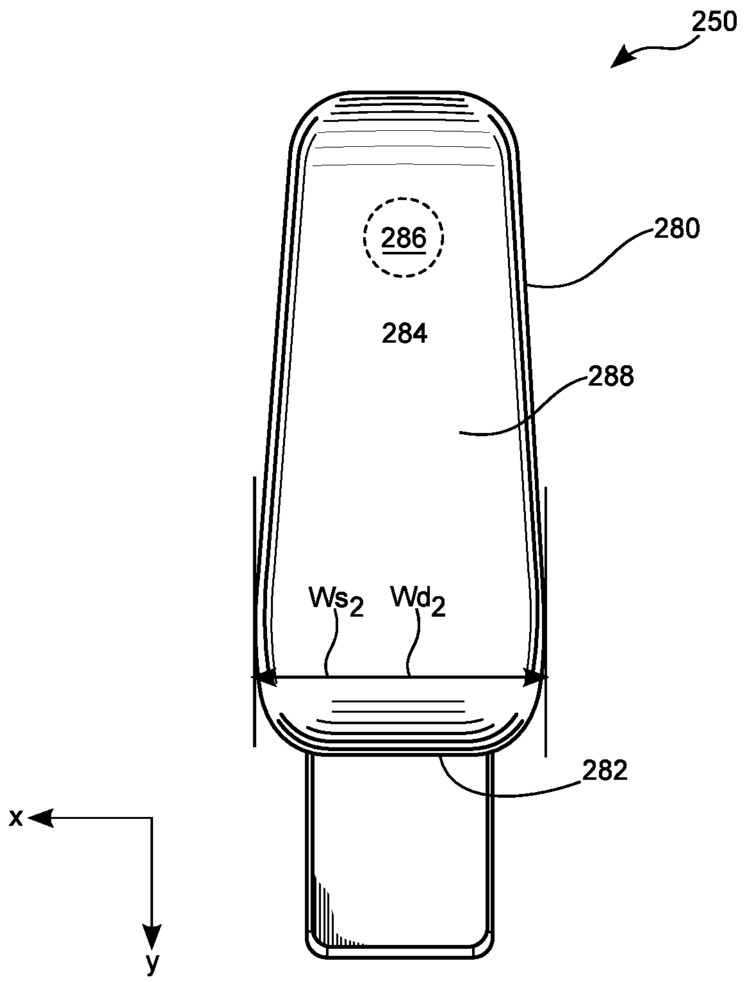

FIGS. 4A-4C show hinge guard or removably attachable hinge cover 250 similar to the hinge guards 50 and 150 shown in FIGS. 2A-2E and FIGS. 3A-3C, respectively, where similar features are indicated by similar reference numbers (plus 200, or plus 100, respectively). The hinge guard 250 can differ from the hinge guards 50, 150 in a number of respects, which may be the same or different to the features shown embodied in the hinge covers 50, 150 and are provided by way of illustration and not by way of limitation. Various differences are shown with respect to the perspective view of FIG. 4A, the cross-sectional view of FIG. 4B in the y-z plane, taken along the section line 4B-4B shown in FIG. 4A, and in the bottom view in the x-y plane shown in FIG. 4C.

As such, FIGS. 4A-4C show a hinge guard or removably attachable hinge cover 250, a snap on feature or connecting feature 260, an inner surface or cylindrically shaped inner surface 262, a width Ws2 of snap on feature 260, a thickness T2 that extends between the inner surface 262 or the top portion 268 of the inner surface 262 and the outer surface 288 of the deflecting feature 280, a diameter Ds2 of the inner surface 262, an axis As2 of the snap on feature 260, a c-shaped cross-section 264, an opening 266, a top portion 268, sidewalls or a deformable portion 270 of snap on feature 260, a deflecting feature or protective portion 280, a width Wd2 of deflecting feature 280, an upper or first ramp portion 282, a lower or second ramp portion 284, a weight or counterbalance 286, an outer or upper surface 288, an offset between top of tabs 36, 38, 40, 42 and the outer surface 288, a height Hc2 of the hinge cover 250 in y-direction, and a relative angle θ2 between the outer surface 288 of upper ramp portion 282 and lower ramp portion 284.

Differences between the hinge guard 250 and the hinge guards 50, 150 can include, for example, the snap on feature 260 of hinge guard 250 comprising a width Ws2 that is equal to the width Wd2 of the deflecting feature 280. As such the width Wd2 of the deflecting feature 280 can be less than a width of 5 cm and configured to be coupled around a hinge fulcrum 30 between tabs 36, 38, 40, 42 of the hinge 10 without extending to the tabs 36, 38, 40, 42 of the hinge 10.

Additionally, a thickness of T2 that extends between the inner surface 162 or the top portion 168 of the inner surface 162 and the outer surface 188 of the deflecting feature 180 can be the same, less than, or greater than the thicknesses T and T1 of the hinge guards 50, 150. Furthermore, the hinge guard 250 can also be formed with the snap on feature 260, the deflecting feature 280, including both the upper or first ramp portion 282 and the lower or second ramp portion 284, being integrally formed as a single unit as shown.

FIGS. 5A-5D show a hinge guard or removably attachable hinge cover 350 similar to the hinge guards 50, 150, and 250 shown in FIGS. 2A-2E and FIGS. 3A-3C, and 4A-4C, respectively, where similar features are indicated by similar reference numbers (plus 300, 200, or 100, respectively). The hinge guard 350 can differ from the hinge guards 50, 150, 250 in a number of respects, which may be the same or different to the features shown embodied in the hinge covers 50, 150, 250, and are provided by way of illustration and not by way of limitation. Various differences are shown with respect to the perspective view of FIG. 5A, the top view of FIG. 5B in the x-y plane, in the bottom view in the x-y plane shown in FIG. 5C, and in the side view in the y-z plane shown in FIG. 5D.

Figure 5A:
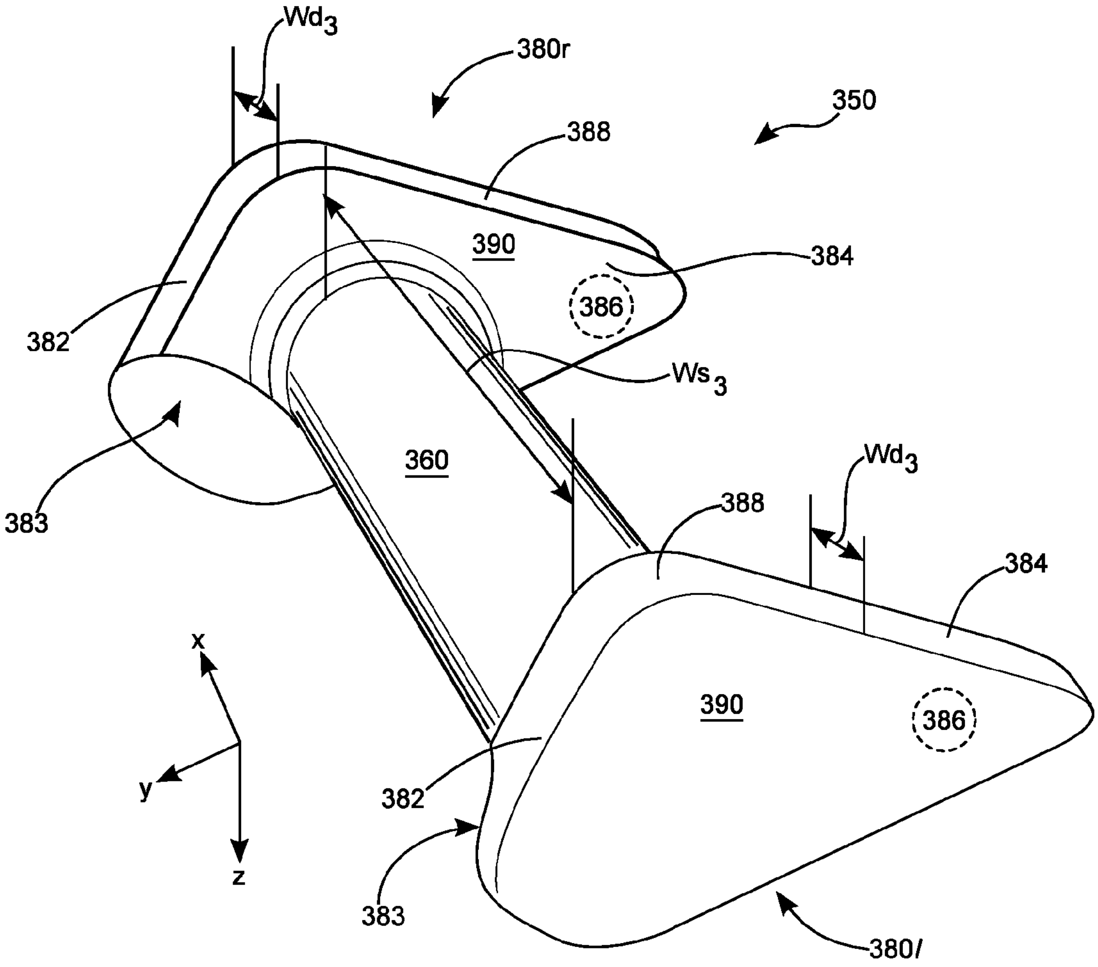
FIGS. 5A-5D depict various views of another embodiment of a hinge cover.
Figure 5B:
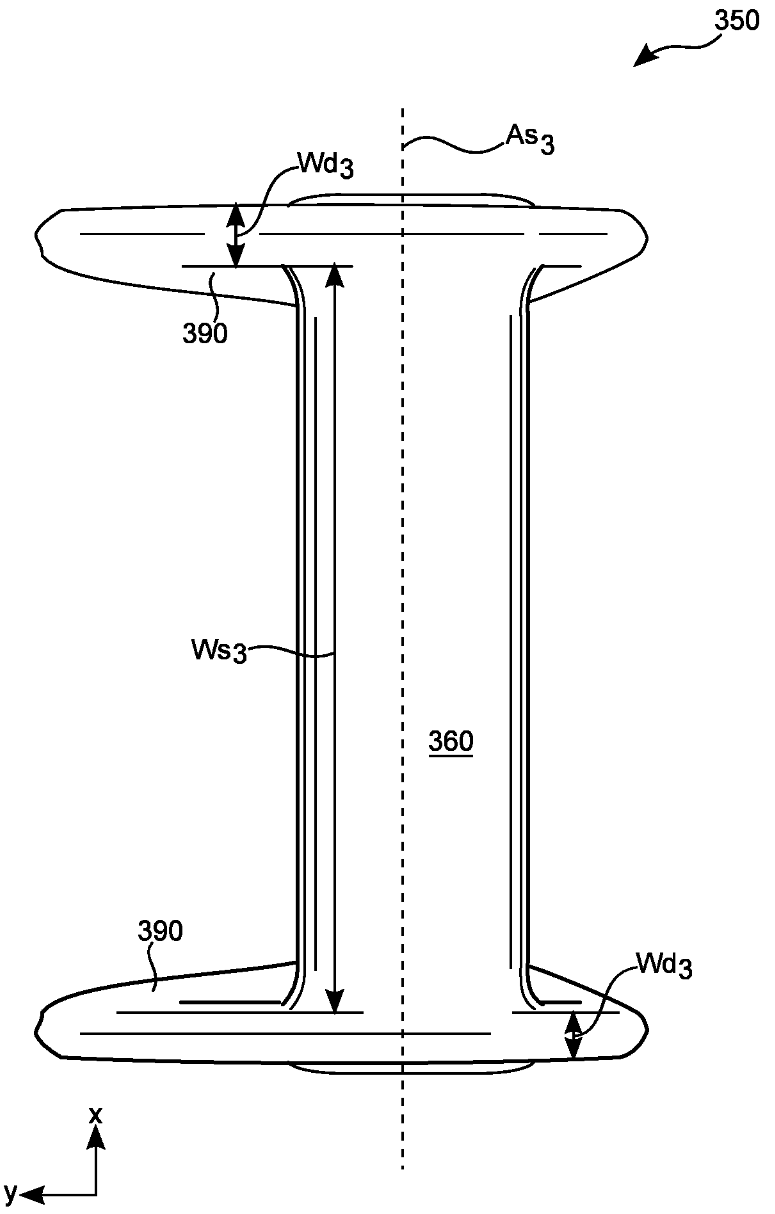
Figure 5C:
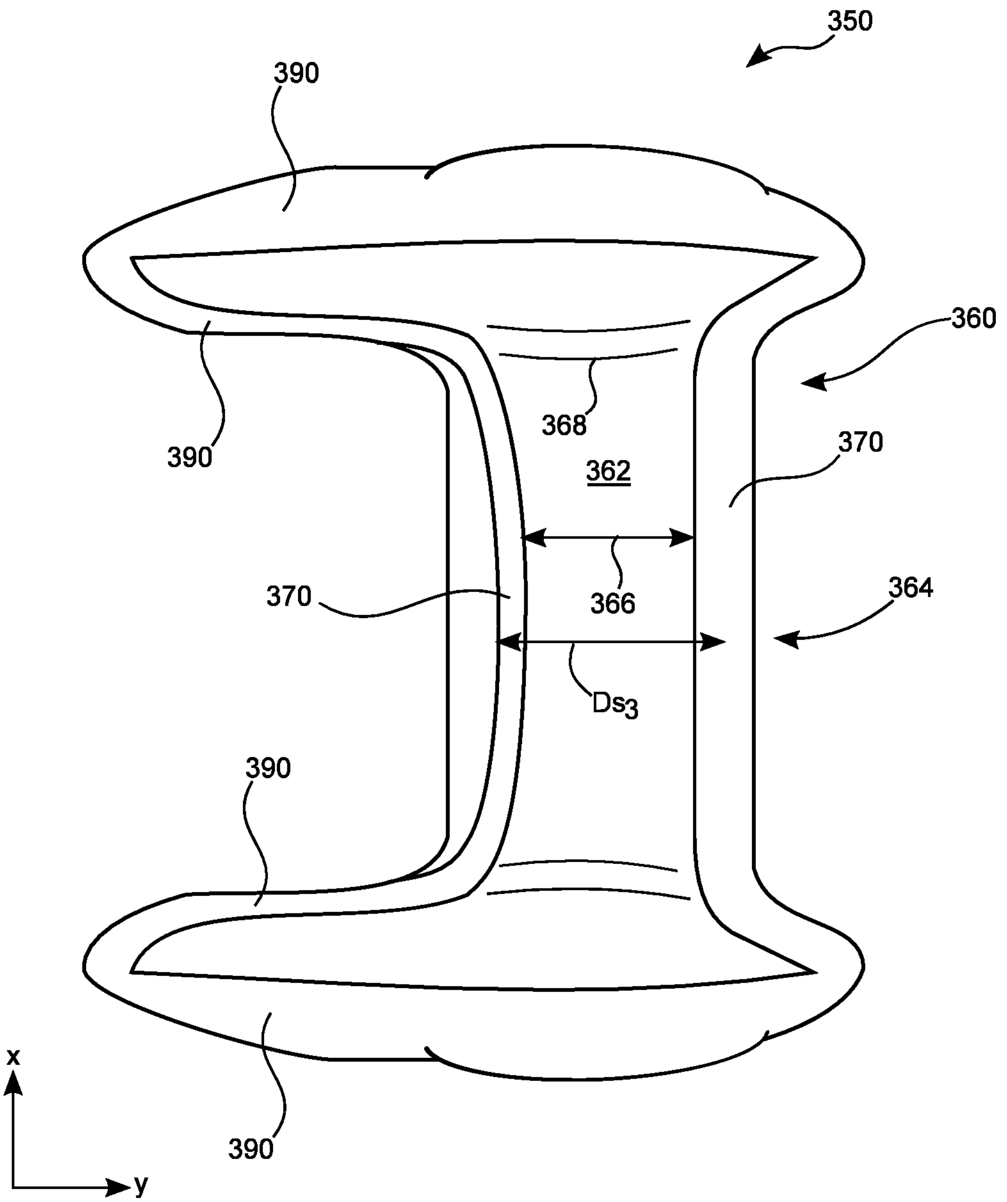
Figure 5D:
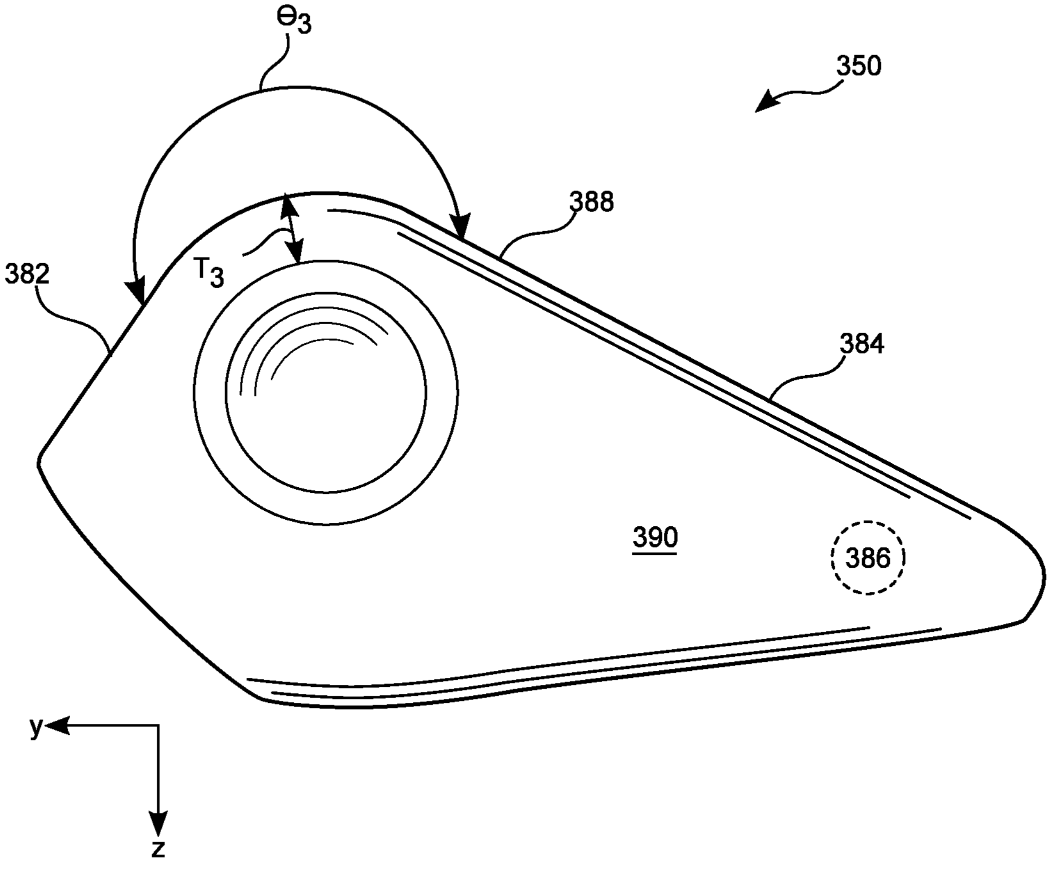

As such, FIGS. 5A-5C show a hinge guard or removably attachable hinge cover 350, a snap on feature or connecting feature 360, an inner surface or cylindrically shaped inner surface 362, a width Ws3 of snap on feature 360, a thickness T3 that extends between the inner surface 362 or the top portion 368 of the inner surface 362 and the outer surface 388 of the deflecting feature 380, a diameter Ds3 of the inner surface 362, an axis As3 of the snap on feature 360, a c-shaped cross-section 364, an opening 366, a top portion 368, sidewalls or a deformable portion 370 of snap on feature 360, deflecting features or protective portions 380, a width Wd3 of deflecting feature 380, an upper or first ramp portion 382, a lower or second ramp portion 384, a weight or counterbalance 386, an outer or upper surface 388, an offset between top of tabs 36, 38, 40, 42 and the outer surface 388, a height Hc3 of the hinge cover 350 in y-direction, and a relative angle θ3 between the outer surface 288 of upper ramp portion 382 and lower ramp portion 384.

Differences between the hinge guard 350 and the hinge guards 50, 150, and 250 can include, for example, the deflecting feature 380 being divided into two separate portions, such as right deflecting feature 380*r* and a left deflecting feature 3801, which can be configured to be releasably coupled to tabs 36 and 40, as well as tabs 38 and 42, respectively. In such an instance, the deflecting feature 380 can be configured to couple to inner and outer opposing surfaces of tabs 40 and 42 extending from a lower hinge leaf 34, and is further configured to couple to outer surfaces and not inner surfaces of tabs 36, 38 extending from an upper hinge leaf 32. The tabs 36, 38 can move within the hinge guard 350 without the hinge guard 350 contacting the inner surfaces of the tabs 36, 38 because of notches or cut-outs 383, formed in the divided deflecting features 380, such as upper or first ramp portions 382.

Figure 6:
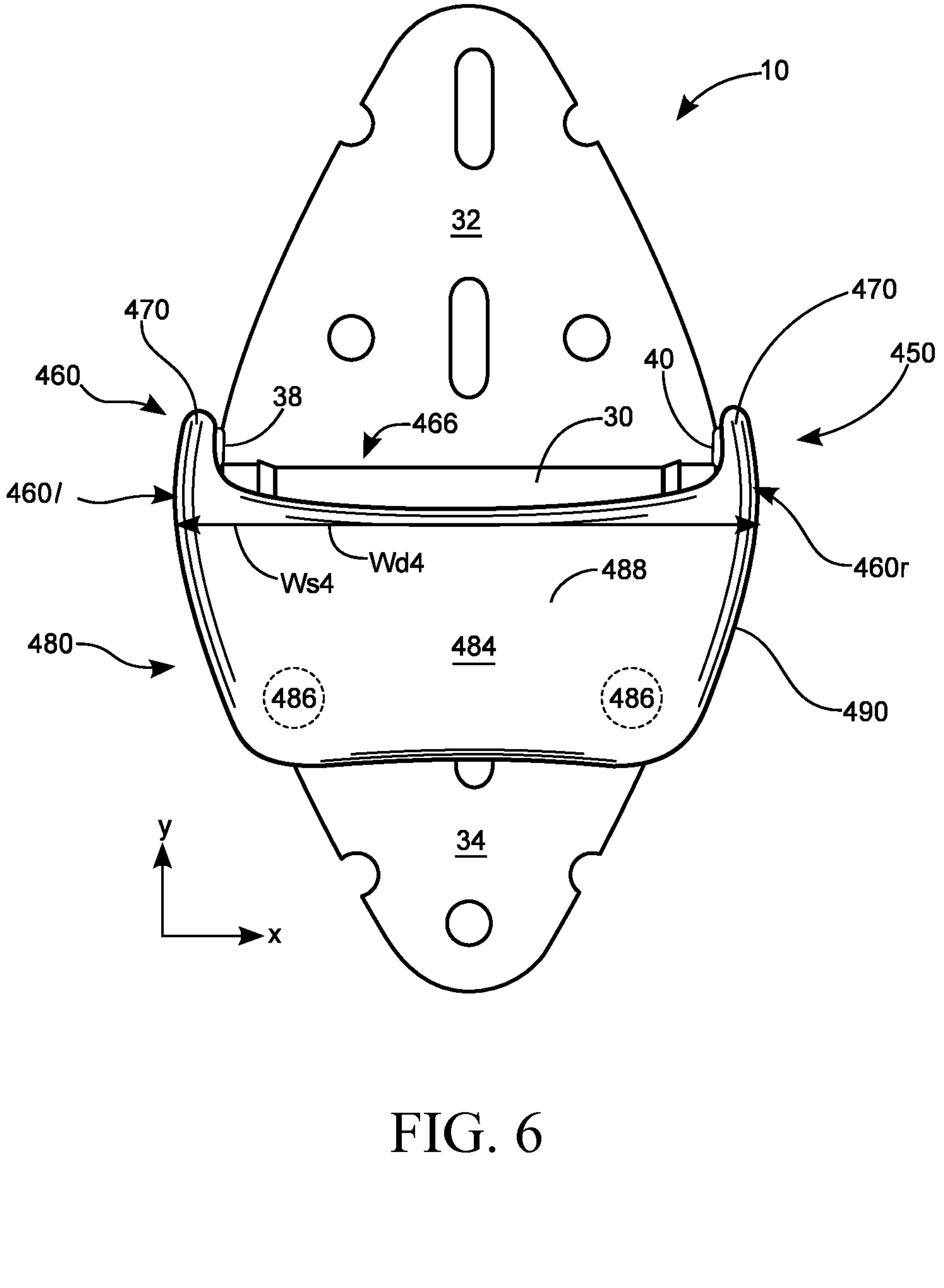
FIG. 6 depicts another embodiment of a hinge cover

FIG. 6 shows a hinge guard or removably attachable hinge cover 450 similar to the hinge guards 50, 150, 250, and 350 shown in FIGS. 2A-2E, FIGS. 3A-3C, FIGS. 4A-4C, and 5A-5D, respectively, where similar features are indicated by similar reference numbers (plus 400, 300, 200, or 100, respectively). The hinge guard 450 can differ from the hinge guards 50, 150, 250, 350 in a number of respects, which may be the same or different to the features shown embodied in the hinge covers 50, 150, 250, 350 and are provided by way of illustration and not by way of limitation. Various differences are shown with respect to the top view of FIG. 6.

As such, FIG. 6 shows a hinge guard or removably attachable hinge cover 450, a snap on feature or connecting feature 460, including a left snap on feature 460*l* and a right snap on features 460*r*, a width Ws4 of snap on feature 460, a thickness that extends between the inner surface and the outer surface 488 of the deflecting feature 480, an opening 466, a top portion 468, sidewalls or a deformable portion 470 of snap on feature 460, a deflecting feature or protective portion 480, a width Wd4 of deflecting feature 480, a lower or second ramp portion 484, a weight or counterbalance 486, an outer or upper surface 488, and an offset between top of tabs 36, 38, 40, 42 and the outer surface 488.

Differences between the hinge guard 250 and the hinge guards 50, 150 can include, for example, the hinge cover 450 further comprising the snap on feature 460 being configured to couple to tabs 36, 38, 40, 42 at side portions of a hinge 10 without contacting a cylindrically shaped fulcrum portion 30 of the hinge 10. Differences can further include the deflecting feature 470 being formed only a lower ramp portion 482 or with only one ramp, omitting an upper ramp portion. Thus the snap on portion 360 can be formed without a cylindrically shaped inner surface or c-shaped cross-section.

Where the above examples, embodiments and implementations reference examples, it should be understood by those of ordinary skill in the art that other covers and manufacturing devices and examples could be intermixed or substituted with those provided. In places where the description above refers to particular embodiments and methods, it should be readily apparent that a number of modifications may be made without departing from the spirit thereof and that these embodiments and implementations may be applied to other embodiments as well. Accordingly, the disclosed subject matter is intended to embrace all such alterations, modifications and variations that fall within the spirit and scope of the disclosure and the knowledge of one of ordinary skill in the art.

Any dimensions presented in this document are for example only and not a limitation on the scope of this disclosure. It will be understood that embodiments are not limited to the specific components disclosed herein, as virtually any components consistent with the intended operation of the method or system may be utilized. Accordingly, for example, although particular materials, structures, and couplings may be disclosed, such components may comprise any shape, size, style, type, model, version, class, grade, measurement, concentration, material, weight, quantity, or the like consistent with the intended operation of a cover or hinge cover.

What is claimed is:

1. A removably attachable hinge cover coupled to a door hinge comprising tabs, a fulcrum, and hinge leaves, the hinge cover comprising:

- a snap on feature comprising a cylindrically shaped inner surface with a c-shaped cross-section, the c-shaped cross-section comprising a top portion and an opening opposite the top portion sized to fit the hinge fulcrum, the hinge cover being releasably coupled to the hinge without adhesive, screws, or nails; and
- a deflecting feature covering the hinge tabs and integrally formed with the snap on feature, the deflecting feature further comprising:
  - a width extending in a direction of an axis of the cylindrically shaped inner surface of the snap on feature,
  - a first ramp portion sloping away from the top of the snap on feature in a first direction, and
  - a second ramp portion sloping away from the top of the snap on feature in a second direction opposite the first direction, wherein the first ramp portion and the second ramp portion are integrally formed and rigidly set at a fixed relative angle between the first ramp portion and the second ramp portion such that the integrally formed first ramp portion and second ramp portion rotate together as an integrally formed feature about the axis of the cylindrically shaped inner surface of the snap on feature.

2. The hinge cover of claim 1, wherein the c-shaped cross-section of the snap on feature comprises a diameter greater than a distance of the opening.

3. The hinge cover of claim 1, wherein the width of the deflecting feature comprises a distance greater than 5 centimeters and extends over and is contact with outer surfaces of the hinge.

4. The hinge cover of claim 1, wherein the snap on feature and deflecting feature are integrally formed of a same material.

5. The hinge cover of claim 1, wherein the fixed relative angle between an outer surface of the first ramp portion and an outer surface of the second ramp portion is in a range of 180-315 degrees.

6. The hinge cover of claim 1, wherein a thickness between the inner surface of the top portion of the snap on feature and an outer surface of the deflecting feature over the top portion is greater than or equal to 9 millimeters.

7. A removably attachable hinge cover for use with a door hinge comprising tabs, a fulcrum, and hinge leaves, the hinge cover comprising:

a snap on feature sized to fit the hinge and to releasably couple the hinge cover to the hinge without adhesive, screws, or nails; and a deflecting feature, the deflecting feature further comprising:

a width extending in a direction of an axis of the cylindrically shaped inner surface of the snap on feature, a first ramp portion sloping away from the top of the snap on feature in a first direction, and a second ramp portion integrally formed with the first ramp portion, the second ramp portion sloping away from the top of the snap on feature and the first ramp portion.

8. The hinge cover of claim 7, wherein the snap on feature is coupled to the hinge and covers the hinge tabs disposed at side portions of the hinge without contacting a cylindrically shaped fulcrum portion of the hinge.

9. The hinge cover of claim 7, wherein the deflecting feature covers inner and outer opposing surfaces of the hinge tabs.

10. The hinge cover of claim 9, wherein the snap on feature further comprises a c-shaped cross-section with an opening and a top portion opposite the opening, the opening being releasably coupled around the fulcrum of the hinge.

11. The hinge cover of claim 7, wherein the deflecting feature includes a counterbalance disposed within the deflecting feature.

12. The hinge cover of claim 7, wherein the snap on feature and deflecting feature are integrally formed of a same material.

* * * * *